(No Model.)
J. H. ALEXANDER.
PROP BLOCK CUSHION.
No. 324,632. Patented Aug. 18, 1885.
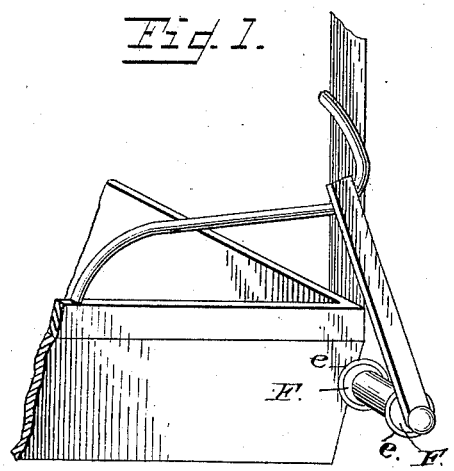
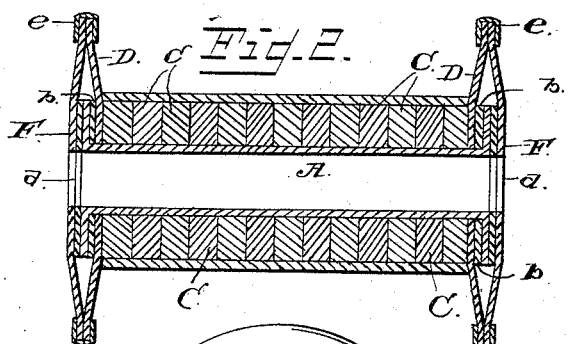
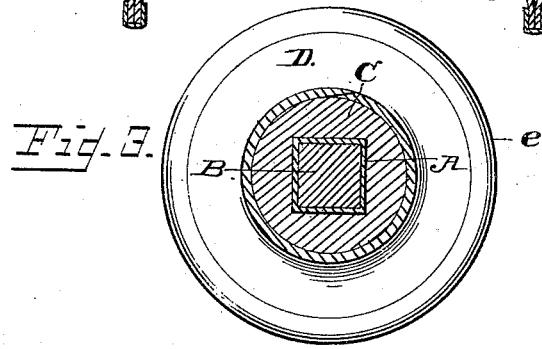
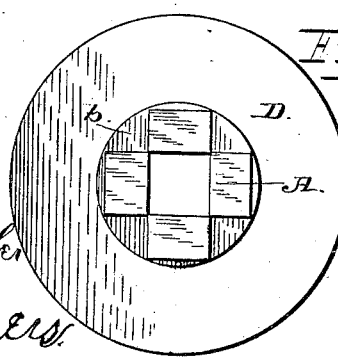
WITNESSES
INVENTOR
J. H. Alexander
by C. A. Snow & Co.
his Attorney

UNITED STATES PATENT OFFICE.

JAMES H. ALEXANDER, OF SYRACUSE, NEW YORK, ASSIGNOR OF ONE-HALF TO CLAYTON L. BAKER AND JOHN W. WILLIAMS, BOTH OF SAME PLACE.

PROP-BLOCK CUSHION.

SPECIFICATION forming part of Letters Patent No. 324,632, dated August 18, 1885.

Application filed March 24, 1885. (No model.)

*To all whom it may concern:*

Be it known that I, JAMES H. ALEXANDER, a citizen of the United States, residing at Syracuse, in the county of Onondaga and State of New York, have invented a new and useful Improvement in Prop-Block Cushions, of which the following is a specification, reference being had to the accompanying drawings.

My invention relates to what are known as "prop-blocks," designed to support the top of a carriage when lowered. Prop-blocks, as ordinarily constructed, are made by slipping a cushion of leather, rubber, or wood on the ends of the prop-iron, with separable washers at each end stitched around the edge. The washers of a prop-block as thus constructed soon sag or are bent out of place and show where they are joined.

My invention has for its object to remedy the above defects and to provide a prop-block which shall be simple in its construction, light, cheap, and durable, and one that may be readily and easily applied.

With these ends in view the invention consists in the improved construction and combinations of parts hereinafter fully described, and pointed out in the claims.

In the drawings, Figure 1 is a perspective view of a sufficient portion of a carriage to illustrate the application of my invention thereto. Fig. 2 is a longitudinal vertical section; and Fig. 3 is a transverse section, while Fig. 4 is an end view with one of the washers removed.

In the accompanying drawings, in which like letters of reference indicate corresponding parts in all the figures, A represents a metal bushing, which is preferably rectangular in cross-section to fit upon the rectangular prop-bolt or iron B on the carriage-body. Upon this bushing A are a series of washers, C, which may be of leather, rubber, or other suitable material, and, if desired, instead of employing a series of washers, a single washer of the required length might be employed.

Upon the ends of the bushing A, which extend beyond the washers C at each end are washers D of a greater diameter than the washers C, against which they bear.

The ends of the bushing A are slitted and turned back against washers $b$ of about the same size as the washers C, said washers $b$ bearing against the washers D.

It will be seen that by slitting the ends of the bushing and turning them back the washers C will be held firmly in place, and that the washers D are securely clamped in position.

Surrounding the washers C, between the washers D, is a covering, which is preferably provided with a finished surface, and is securely held in place by glue or other suitable adhesive substance, though, if desired, it might be held in place by sewing.

F represents washers, which are formed with holes or openings $d$ to correspond to the opening of the bushing A. The said washers F are placed against the washers D, with their finished faces exposed, and the washers F and D are clamped together by metal rims $e$, which inclose the peripheral edges of said washers.

It will be seen that by employing a series of washers as a covering for the metal bushing scraps of material may be utilized which would otherwise be wasted, thus allowing prop-block cushions to be placed upon the market at a greatly reduced cost.

The prop-block above described is simple in its construction, may be manufactured at a slight cost, is light, easily applied, and strong and durable.

Having fully described my invention, what I claim as new, and desire to secure by Letters Patent, is—

1. A prop-block cushion comprising the sleeve or bushing, having a central opening for the passage of the prop bolt or iron, and a washer or washers fitting around the sleeve or bushing, the ends of the latter being slitted to form tongues which are turned back to hold the washer or washers in place, as set forth.

2. The combination, with a metal bushing, having slitted ends, of a washer or washers located thereon, and washers D and F, at the ends of the bushing, said washers being held in place by metal rims, substantially as set forth.

3. The combination, with a metal bushing, having slitted ends, of a washer or washers located thereon, washers D F at the ends of the bushing, metal rims for clamping the same together, and a covering for the washers C, substantially as set forth.

In testimony that I claim the foregoing as my own I have hereto affixed my signature in presence of two witnesses.

JAMES H. ALEXANDER.

Witnesses:
 J. WILLIAM WILSON,
 GEO. H. SEARS.